(12) United States Patent
Barkan et al.

(10) Patent No.: US 12,131,222 B1
(45) Date of Patent: Oct. 29, 2024

(54) SYSTEMS AND METHODS FOR MULTIPLE INDICIA DECODING

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US); Charles Serge Laforge, Hauppauge, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/140,575

(22) Filed: Apr. 27, 2023

(51) Int. Cl.
G06K 7/14 (2006.01)
G06T 7/70 (2017.01)
G06T 15/00 (2011.01)

(52) U.S. Cl.
CPC ......... *G06K 7/1443* (2013.01); *G06K 7/1413* (2013.01); *G06T 7/70* (2017.01); *G06T 15/00* (2013.01); *G06T 2207/30242* (2013.01)

(58) Field of Classification Search
CPC .............. G06K 7/1443; G06K 7/1413; G06K 7/10792; G06K 7/10801; G06T 7/70; G06T 15/00

USPC ........... 235/462.08, 462.11, 462.17, 462.41, 235/462.01, 472.01

See application file for complete search history.

(56) References Cited

U.S. PATENT DOCUMENTS

| 2016/0104019 A1* | 4/2016 | Todeschini | G06K 7/1426 235/472.01 |
| 2016/0300361 A1* | 10/2016 | Xie | G06T 7/246 |

* cited by examiner

*Primary Examiner* — Edwyn Labaze
(74) *Attorney, Agent, or Firm* — Yuri Astvatsaturov

(57) ABSTRACT

Systems and methods for decoding multiple indicia are provided. An example includes an indicia reading device comprising an imaging assembly configured to capture 2D image data of an environment appearing in a first FOV, the first FOV directed at a product scanning region; a depth sensor assembly including at least one depth sensor, wherein the at least one depth senor is configured to capture 3D image data of an environment appearing in a second FOV, the second FOV at least partially overlapping the first FOV; a controller, having at least a processor and a memory, communicably coupled to the imaging assembly and depth sensor assembly. The memory stores computer-readable instructions which when executed by the processor causes the controller to take the following actions: analyze the 2D image data to identify a quantity of indicia present in the 2D image data; analyze the 3D image data to identify a quantity of items present in the 3D image data; and, responsive to the quantity of the indicia present in the 2D image data being equal to or greater than the quantity of items present in the 3D image data, transmit payload data of at least some of the indicia present in the 2D image data to a host.

20 Claims, 5 Drawing Sheets

SYSTEMS AND METHODS FOR MULTIPLE INDICIA DECODING

BACKGROUND

Indicia readers, such as handheld and bi-optic barcode readers or machine vision systems used in retail and warehouse environments, typically capture two-dimensional (2D) images which are used to identify indicia and conduct decoding operations on identified indicia. Generally, these readers are configured to prevent the reader from decoding the same indicium within a specified time interval, a parameter known as same-symbol timeout. In a retail environment, such as a grocery store, if a cashier encounters multiple products of the same type, the cashier typically will take a one of the products, present it to the reader, move the product away from the reader, wait a moment (e.g., one second), and present the same product to the reader again, as opposed to presenting each of the individual products to the reader.

For example, a cashier who encounters three bottles of a sports drink may take one of the bottles, present it to an indicia reader, move the bottle away from the reader, wait a few seconds, and then repeat the process two times with the same bottle, before moving all three bottles to a bagging area. Cashiers do this to prevent a same symbol timeout error. However, this process may add time to checkout and includes the risk of a cashier accidentally presenting one of the remaining items when moving them in bulk to a bagging area. Additionally, this process may create inventory tracking issues. For example, if a cashier encounters three bottles of a sports drink with the same indicia affixed to each, but the bottles are all different flavors of the sports drink. The cashier may scan one of the flavors three times, which may result to discrepancies in the inventory that is tracked through the indicia reader and what the store actually has stocked. This may further cause issues with re-ordering and restocking the appropriate inventory of the product.

Also, in self-checkout environments, a consumer presents objects to the reader, and so the above mentioned reading process may not be intuitive to self-checkout customer, which may result in customers encountering same symbol timeout errors and having difficult operating the indicia reader. Accordingly, there is a need for an indicia reading device and method that overcomes these challenges

SUMMARY

Systems and methods for decoding multiple indicia are provided. In an embodiment, the present invention is an indicia reading device comprising an imaging assembly configured to capture two-dimensional (2D) image data of an environment appearing in a first field of view (FOV), the first FOV directed at a product scanning region. The indicia reading device further comprises a depth sensor assembly including at least one depth sensor, wherein the at least one depth senor is configured to capture three-dimensional (3D) image data of an environment appearing in a second FOV, the second FOV at least partially overlapping the first FOV. The indicia reading device further comprises a controller, having at least a processor and a memory, communicably coupled to the imaging assembly and depth sensor assembly. The memory stores computer-readable instructions which when executed by the processor causes the controller to take the following actions: analyze the 2D image data to identify a quantity of indicia present in the 2D image data; analyze the 3D image data to identify a quantity of items present in the 3D image data; and, responsive to the quantity of the indicia present in the 2D image data being equal to or greater than the quantity of items present in the 3D image data, transmit payload data of at least some of the indicia present in the 2D image data to a host.

In a variation of this embodiment, the memory stores the computer-readable instructions which when executed by the processor further cause the controller to, responsive to the quantity of the indicia present in the 2D image data being less than the quantity of items present in the 3D image data, transmit a message to a processing module for a determination of whether or not at least some of the items present in the 3D image data are not required to be associated with an indicium, and take responsive action based on the determination of whether or not the at least some of the items present in the 3D image data are not required to be associated with the indicium.

In another variation of this embodiment, the memory stores the computer-readable instructions which when executed by the processor further cause the controller to, responsive to the quantity of the indicia present in the 2D image data being less than the quantity of items present in the 3D image data, transmit a message to an alert module indicating a mismatch between the quantity of the indicia and the quantity of the items.

In another variation of this embodiment, the memory stores the computer-readable instructions which when executed by the processor further cause the controller to, analyze the 2D image data to identify the quantity of indicia present in the 2D image data and analyze the 3D image data to identify the quantity of items present in the 3D image data by, respectively analyzing a subset of 2D image data and a subset of 3D image data that overlap at least partially in acquisition time.

In another variation of this embodiment, the memory stores the computer-readable instructions which when executed by the processor further cause the controller to, analyze the 2D image data to identify the quantity of indicia present in the 2D image data by at least one of transmitting the data to a decoder module and transmitting the data to a barcode-finder module, the barcode-finder module occurring prior to the decoder module in a processing pipeline.

In another variation of this embodiment, the memory stores the computer-readable instructions which when executed by the processor further cause the controller to, analyze the 3D image data to identify the quantity of items present in the 3D image data by identifying gaps of predetermined length or volume between objects appearing within the product scanning region.

In another variation of this embodiment, the memory stores the computer-readable instructions which when executed by the processor further cause the controller to, analyze the 3D image data to identify the quantity of items present in the 3D image data by determining a volume of an object appearing within the product scanning region and, based on volumetric data associated at least one of the indicia present in the 2D image data, further determining a quantity of items that would be required to achieve a combined volume such that the combined volume would be within a predetermined threshold of the volume of the object appearing within the product scanning region.

In another variation of this embodiment, the indicia present in the 2D image data is limited to indicia of the same type. Also, the memory stores the computer-readable instructions which when executed by the processor further cause the controller to, transmitting payload data of at least some of the indicia present in the 2D image data to a host responsive to the quantity of the indicia present in the 2D image data being equal to the quantity of items present in the 3D image data.

In another variation of this embodiment, the memory stores the computer-readable instructions which when executed by the processor further cause the controller to, responsive to the quantity of the indicia present in the 2D image data being equal to or greater than the quantity of items present in the 3D image data, generate at least one of a visual alert or an audio alert indicative of the quantity of items present in the 3D image data.

In another variation of this embodiment, the memory stores the computer-readable instructions which when executed by the processor further cause the controller to determine if each of the items present in the 3D image data is associated with a respective at least one of the indicia present in the 2D image data. Also, the memory stores the computer-readable instructions which when executed by the processor further cause the controller, responsive to determining that each of the items present in the 3D image data is associated with the respective at least one of the indicia, transmit payload data of at least some of the indicia present in the 2D image data to a host wherein the payload data of at least some of the indicia is limited to a payload of the respective at least one of the indicia associated with each of the items present in the 3D image data.

In another embodiment, the present invention is a method for reading indicia comprising capturing two-dimensional (2D) image data of an environment appearing in a first field of view (FOV) using an imaging assembly. The first FOV is directed at a product scanning region. The method further comprises capturing three-dimensional (3D) image data of an environment appearing in a second FOV using a depth sensor assembly including at least one depth sensor. The second FOV at least partially overlaps the first FOV. The method further comprises analyzing the 2D image data to identify a quantity of indicia present in the 2D image data and analyzing the 3D image data to identify a quantity of items present in the 3D image data. The method further comprises, responsive to the quantity of the indicia present in the 2D image data being equal to or greater than the quantity of items present in the 3D image data, transmitting payload data of at least some of the indicia present in the 2D image data to a host.

In a variation of this embodiment, the method further comprises, responsive to the quantity of the indicia present in the 2D image data being less than the quantity of items present in the 3D image data, transmitting a message to a processing module for a determination of whether or not at least some of the items present in the 3D image data are not required to be associated with an indicium, and take responsive action based on the determination of whether or not the at least some of the items present in the 3D image data are not required to be associated with the indicium.

In another variation of this embodiment, the method further comprises, responsive to the quantity of the indicia present in the 2D image data being less than the quantity of items present in the 3D image data, transmit a message to an alert module indicating a mismatch between the quantity of the indicia and the quantity of the items.

In another variation of this embodiment, the method further comprises analyzing the 2D image data to identify the quantity of indicia present in the 2D image data and analyzing the 3D image data to identify the quantity of items present in the 3D image data respectively by analyzing a subset of 2D image data and a subset of 3D image data that overlap at least partially in acquisition time.

In another variation of this embodiment, the method further comprises analyzing the 2D image data to identify the quantity of indicia present in the 2D image data by at least one of transmitting the data to a decoder module and transmitting the data to a barcode-finder module, the barcode-finder module occurring prior to the decoder module in a processing pipeline.

In another variation of this embodiment, the method further comprises analyzing the 3D image data to identify the quantity of items present in the 3D image data by identifying gaps of predetermined length or volume between objects appearing within the product scanning region.

In another variation of this embodiment, the method further comprises analyzing the 3D image data to identify the quantity of items present in the 3D image data by determining a volume of an object appearing within the product scanning region and, based on volumetric data associated at least one of the indicia present in the 2D image data, further determining a quantity of items that would be required to achieve a combined volume such that the combined volume would be within a predetermined threshold of the volume of the object appearing within the product scanning region.

In another variation of this embodiment, the method further comprises the indicia present in the 2D image data being limited to indicia of the same type. Additionally, the method comprises transmitting payload data of at least some of the indicia present in the 2D image data to a host responsive to the quantity of the indicia present in the 2D image data being equal to the quantity of items present in the 3D image data.

In another variation of this embodiment, the method further comprises responsive to the quantity of the indicia present in the 2D image data being equal to or greater than the quantity of items present in the 3D image data, generate at least one of a visual alert or an audio alert indicative of the quantity of items present in the 3D image data.

In another variation of this embodiment, the method further comprises determining if each of the items present in the 3D image data is associated with a respective at least one of the indicia present in the 2D image data. Additionally, the method comprises responsive to determining that each of the items present in the 3D image data is associated with the respective at least one of the indicia, transmit payload data of at least some of the indicia present in the 2D image data to a host wherein the payload data of at least some of the indicia is limited to a payload of the respective at least one of the indicia associated with each of the items present in the 3D image data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
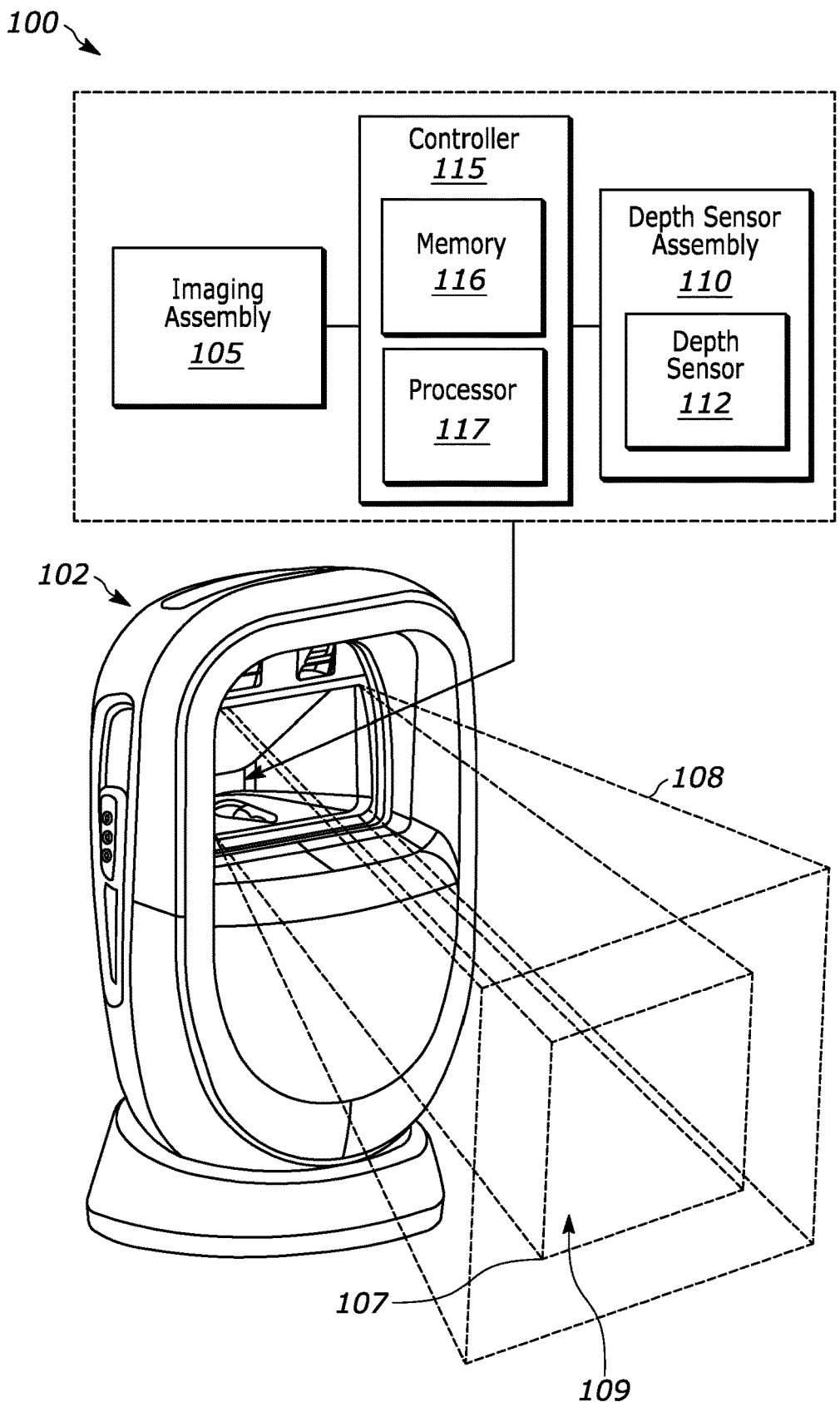
FIG. 1 illustrates an example indicia reading device of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Same symbol timeout errors and efforts to prevent them may result in longer checkout times, challenges with inventory tracking, and other issues. Therefore, a system and method that allowed for the decoding of multiple indicia on a single presentation to an indicia reader would be beneficial.

FIG. 1 illustrates an example indicia reading device 100 of the present invention. The indicia reading device 100 may include an imaging assembly 105 configured to capture 2D image data of an environment appearing in a first FOV 107. The first FOV 107 is directed at a product scanning region 109. For example, the product scanning region 109 may be an area in a retail environment in which a cashier presents an object to the device 100 for reading of indicia affixed to the object. Although the first FOV 107 may be seen as extending indefinitely, the imaging assembly 105 may have a working range over the first FOV 107 in which indicia captured in the 2D image data in the working range will likely have sufficient image quality for decoding operations performed on the indicia successfully. As the first FOV 107 is directed at the product scanning region 109, the first FOV 107 may extend over the product scanning region 109 in such a manner that the product scanning region 109 is located within the working range of the imaging assembly 105.

The indicia reading device 100 may also include a depth sensor assembly 110 including at least one depth sensor 112, wherein the at least one depth senor 112 is configured to capture three-dimensional (3D) image data of an environment appearing in a second FOV 108, the second FOV 108 at least partially overlapping the first FOV 107. The at least one depth sensor 112 may be a one of a direct time of flight sensor, an indirect time of flight sensor, a stereoscopic sensor, or a structured light sensor.

The indicia reading device 100 may also include a controller 115, having at least a processor 117 and a memory 116, communicably coupled to the imaging assembly 105 and depth sensor assembly 110, the memory 116 storing computer-readable instructions which when executed by the processor 117 causes the controller 115 to analyze the 2D image data to identify a quantity of indicia present in the 2D image data and analyze the 3D image data to identify a quantity of items present in the 3D image data.

The example processor 117 of FIG. 1 may also include a network interface (not shown) to enable communication with other machines via, for example, one or more networks. The example network interface includes any suitable type of communication interface(s) (e.g., wired and/or wireless interfaces) configured to operate in accordance with any suitable protocol(s).

The controller 115 may also analyze the 3D image data to identify the quantity of items present in the 3D image data by identifying gaps of predetermined length or volume between items appearing within the product scanning region 109. For example, the controller 115 may identify two indicia based on analyzing the 2D image data, and the controller 115, by analyzing the 3D image data, may determine if there is a variation in the detected depth between the identified indicia. If this variation exceeds a given threshold, the controller 115 may determine the presence of multiple items. In this manner, the controller 115 may also verify that each of the identified indicia appears on a distinctly different object.

The controller 115 may also analyze the 2D image data to identify the quantity of indicia present in the 2D image data and analyze the 3D image data to identify the quantity of items present in the 3D image data by, respectively analyzing a subset of 2D image data and a subset of 3D image data that overlap at least partially in acquisition time. For example, the controller 115 may correlate specific frames of the 2D image data with specific frames of the 3D image data, the 2D image data frames being captured by the imaging assembly at or at least partially at the same time the 3D image frames were captured by the at least one depth sensor. By correlating these frames based on acquisition time, the controller 115 may determine if the identified indicia actually appeared on the identified quantity of items in the product scanning region 109.

In response to the quantity of the indicia present in the 2D image data being equal to or greater than the quantity of items present in the 3D image data, the controller 115 may transmit payload data of at least some of the indicia present in the 2D image data to a host (not shown). The host may include, for example, a point-of-sale system remote from the indicia reading device. For example, by analyzing the 2D image data and the 3D image data, the controller 115 may identify four indicia affixed to four items; in response, the controller 115 may transmit the payload data of the four indicia to a host. Alternatively, by analyzing the 2D image data and the 3D image data, the controller 115 may identify five indicia affixed to four items, for example one of the items may have two identical indicia which appear product scanning region affixed to it; in response, the controller 115 may transmit the payload data of four of the indicia to a host, excluding one of the indicia which appeared on the item having two identical indicia.

The indicia present in the 2D image may be limited to indicia of the same type, for example Universal Product Code barcodes or QR codes. The controller 115 may also transmit the payload data of at least some of the indicia present in the 2D image data to a host, responsive to the quantity of the indicia present in the 2D image data being equal to the quantity of items present in the 3D image data.

The indicia reading device may also include a housing 102 configured to support the controller 115, the imaging assembly, and the depth sensor assembly. The housing 102 may be configured to support handheld or hands-free operation modes. Additionally, the housing 102 may be configured such that the indicia reading device 100 is a bi-optic scanner. A bi-optic scanner or bi-optic reader is a reader that may utilize an image assembly including multiple image sensors, having additional fields of view, such that the reader may attempt to read the indicia affixed from multiple angles.

Also, a bi-optic scanner may utilize a variety mirrors to reflect light to allow for appropriate imaging by the imaging assembly.

Figure 2:
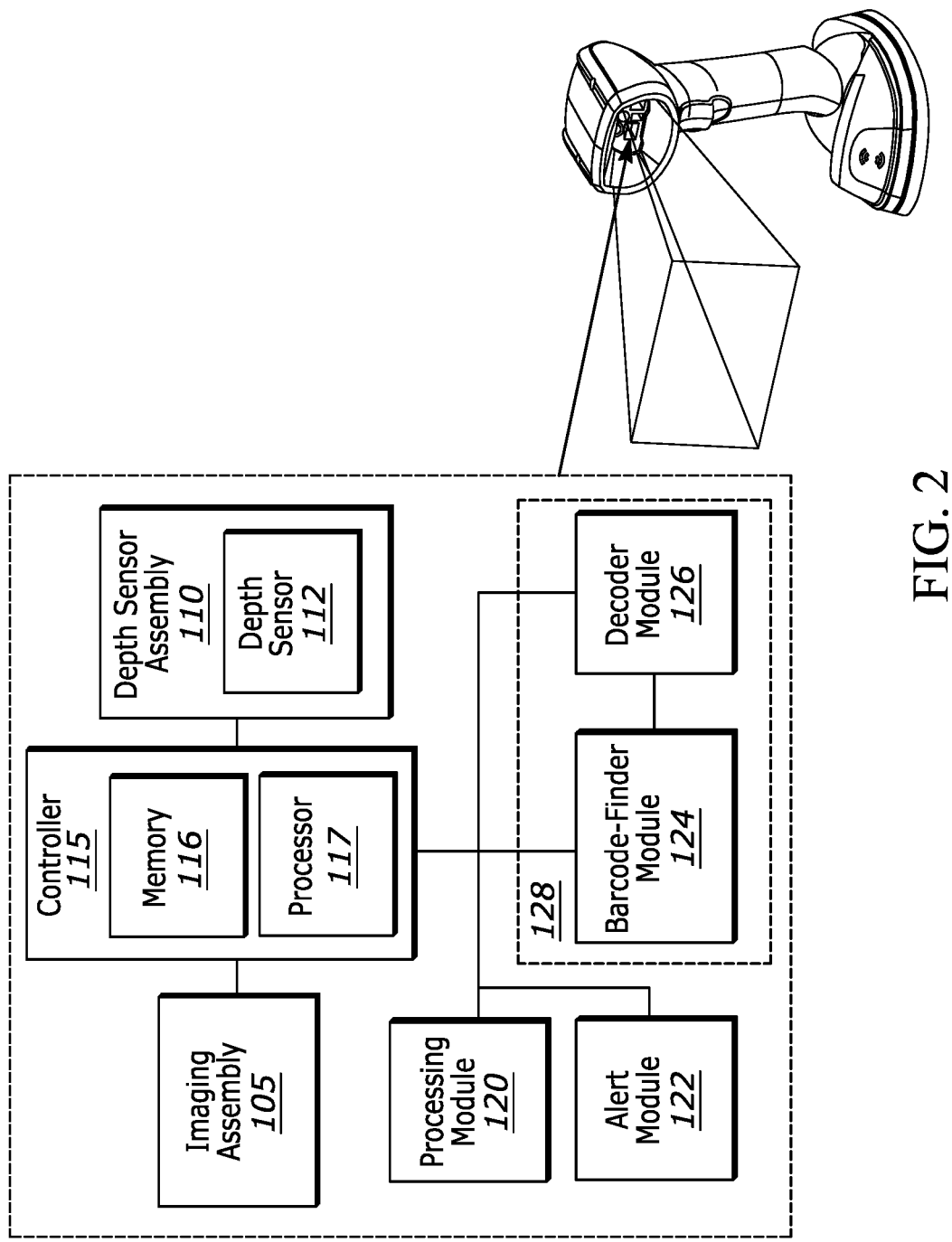
FIG. 2 illustrates an additional example indicia reading device of the present invention.

FIG. 2 illustrates an additional example indicia reading device 100 of the present invention. The indicia reading device 100 may also include a processing module 120. In response to the controller 115 identifying a quantity of the indicia present in the 2D image data that is less than the quantity of items identified in the 3D image data, the controller 115 may transmit a message to a processing module 120 for a determination of whether or not at least some of the items present in the 3D image data are not required to be associated with an indicium present in the 2D image data. The controller 115 may take responsive action based on the determination by the processing module 120 of whether or not the at least some of the items present in the 3D image data are not required to be associated with the indicium. For example, by analyzing the 2D image data and the 3D image data, the controller 115 may identify five indicia and identify six items; in response, the controller 115 may transmit a message, which may include relevant frames of the 2D image data and/or the 3D image data, to a processing module 120. The processing module 120 may be configured to determine whether or not the at least some of the items present in the 3D image data are not required to be associated with the indicium. For instance, the six items identified by the controller 115 may include five products a consumer is purchasing, and the sixth item may be the consumer's purse. The processing module may determine that purse is not required to have an associated indicium, and, in response, the controller 115 may transmit the payload data of the identified indicia to a host (not shown).

The indicia reading device 100 may also include an alert module 122. Responsive to the quantity of the indicia present in the 2D image data being less than the quantity of items present in the 3D image data, the controller 115 may transmit a message to the alert module 122 indicating a mismatch between the quantity of the indicia and the quantity of the items. The alert module 122 may generate a mismatch error, which, as a result, the controller 115 may not transmit any of the payload data of the identified indicia in the product scanning region 109. The alert module 122 may be configured to generate a log or report of the mismatch which may be transmitted to a remote host.

The indicia reading device 100 may also include a decoder module 126 and a barcode-finder module 124 in a processing pipeline 128. In analyzing the 2D image data to identify the quantity of indicia present in the 2D image data, the controller 115 may transmit the 2D image data to the decoder module 126 and may transmit the data to a barcode-finder module 124. The barcode-finder module 124 may occur prior to the decoder module 126 in the processing pipeline 128. For example, the controller 115 may transmit the 2D image data to a barcode-finder module, which may be configured to identify coordinates associated with indicia affixed to items and appearing in frames of the 2D image data. The barcode-finder may use the identified coordinates to assist in identifying the quantity of indicia present in product scanning region in the 2D image data. The controller 115 may then transmit the data the decoder module, which may be configured to perform a decoding operation on the identified indicia. This may include decoding the payload information encoded in the identified indicia.

In an additional example, a grocery store customer using a self-checkout system may move three cans of the same product, each with indicia affixed thereto, into a product scanning region. The controller 115 may transmit the 2D image data captured by the imaging assembly to the barcode-finder module 124.

The barcode-finder module 124 may identify the coordinates associated with the indicia appearing in frames of the 2D image data. The controller 115 may further transmit the 2D image data and the output of the barcode-finder module 124 to the decoder module 126. The decoder module may decode the payload data of each of the indicia identified by the barcode-finder module. The controller 115 may also analyze the 3D image data captured by the at least one depth sensor of the depth sensor assembly to identify the four objects present in the product scanning region. Accordingly, the controller 115 may transmit the payload information of the three identified indicia to a remote host. This results in a system which allows for the decoding of multiple indicia simultaneously, which would prevent items from being scanned more than once (the purpose of the same symbol timeout) while moving through the product scanning region, would reduce checkout times, and would allow for proper inventory tracking by ensuring that the indicia of each purchased item is read and has its payload data decoded and transmitted to a host, such as a POS system.

Also, the controller 115 may, in response to the quantity of the indicia present in the 2D image data being equal to or greater than the quantity of items present in the 3D image data, generate at least one of a visual alert or an audio alert indicative of the quantity of items present in the 3D image data. As such, the indicia reading device may further include a light and a speaker (not shown) through which these alerts may be delivered to a user. For example, the controller 115 may identify five indicia and five of the same type of object and transmit the payload data of all five identified indicia in the product scanning region. The controller 115 may cause the light to flash five times and/or the speaker to play five signal tones to indicate to the user that the five barcodes were read and their associated payload data was transmitted to a host.

The controller 115 may also analyze the 3D image data to identify the quantity of items present in the 3D image data by determining a volume of an object appearing within the product scanning region 109. For example based the 3D image data, the controller 115 may use the depth data to calculate the volume of an object appearing in frames of the 3D image data. Based on the determined volumetric data associated at least one of the indicia present in the 2D image data, the controller 115 may further determine a quantity of items that would be required to achieve a combined volume such that the combined volume would be within a predetermined threshold of the volume of the objects appearing within the product scanning region. The controller 115 may also analyze the 3D image data to identify the quantity of items present in the 3D image data by determining an area of an object appearing within the product scanning region 109.

Figure 3:
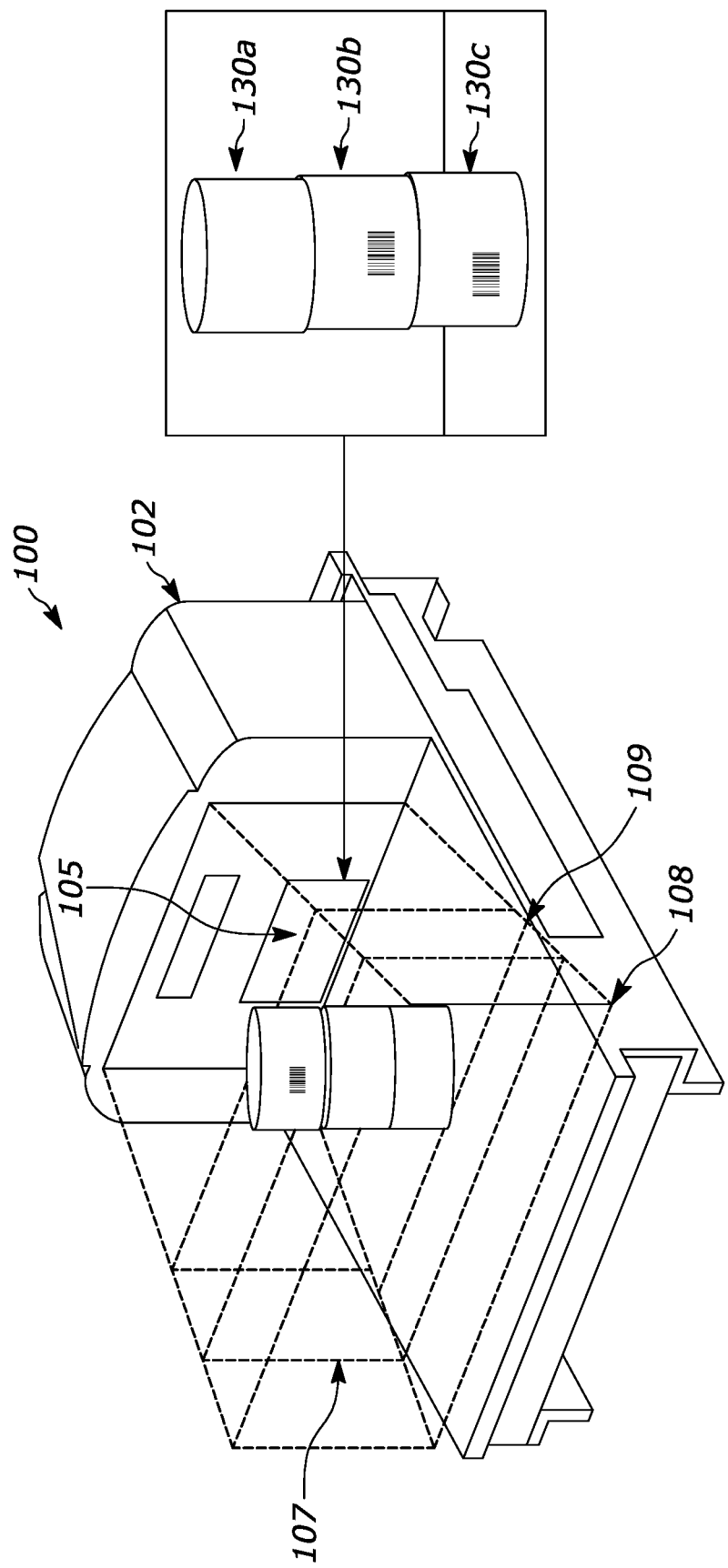
FIG. 3 illustrates an additional example indicia reading device of the present invention.

For example, as shown in FIG. 3, which illustrates an additional example indicia reading device 100 of the present invention that includes a view from the viewpoint of the imaging assembly, a cashier or customer may present a stack of three cans of cat food to the product scanning region 109; however, the cashier or customer may not present the stack in a manner in which the indicia, in this case a barcode, of each can is visible to the imaging assembly. As such, the controller 115 may determine the volume of one of the cans, e.g. 130c, to be 5 in$^3$ based on the 3D image data. Based on the 2D image and the determined volume of can 130c, the controller 115 may determine the volume all of the items appearing in the product scanning region to be around 15 in$^3$. The controller 115 may further determine that three cans of cat food, associated with the identified indicia, would be required to achieve a combined volume that is within a predetermined threshold of the volume of the objects appearing within the product scanning region 109, e.g. within 0.1 in$^3$ of the total volume of all of the items appearing in the product scanning region 109. The threshold may vary based on the resolution of the sensors being used, for example with lower resolution sensors the threshold may be within 1 in$^3$ of the total volume while with higher resolution sensors the threshold may be much smaller. Accordingly, the controller 115 may transmit the payload data of the indicia affixed to can 130*b* and 130*c* to a host. Additionally, the controller 115 may retransmit the payload of one of the identified indicia until the number of payloads transmitted to the host is equal to the number of items determined to be required to achieve the combined volume.

The controller 115 may assume that the indicia that was not captured matches the indicia that was captured, and so the controller 115 may transmit the payload of the indicia to the host twice. This retransmission may include a flag or a message that logs that three cans were detected but only two indicia were captured in the 2D image data. This retransmission may also include alerting the user of the device that an item was not captured. Alternatively, the device may alert the user that an item was not captured without retransmitting.

The indicia reading device 100 may store the determined volumetric data with an associated indicia, such that the next time that indicia is identified by the controller 115, the controller 115 may fetch the stored volumetric data associated with the item.

Figure 4:
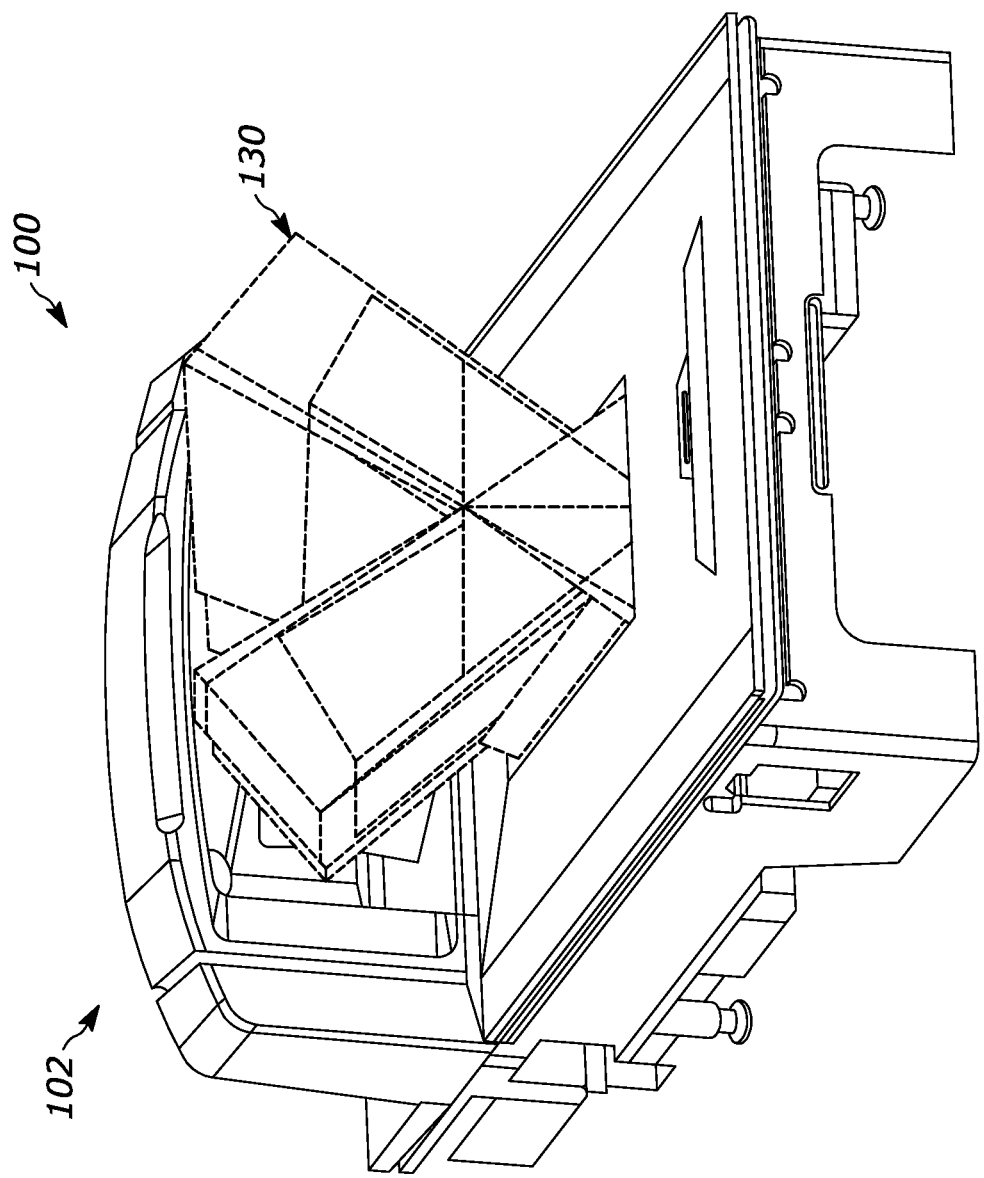
FIG. 4 illustrates an additional example indicia reading device of the present invention.

FIG. 4 illustrates an additional example of the present invention. The indicia reading device may be configured to be a bi-optic scanner, which may include an imaging assembly with a plurality of image sensors and a plurality of fields of view. The indicia reading device may include a third FOV 130 and a fourth FOV 132, which are substantially vertical.

Figure 5:
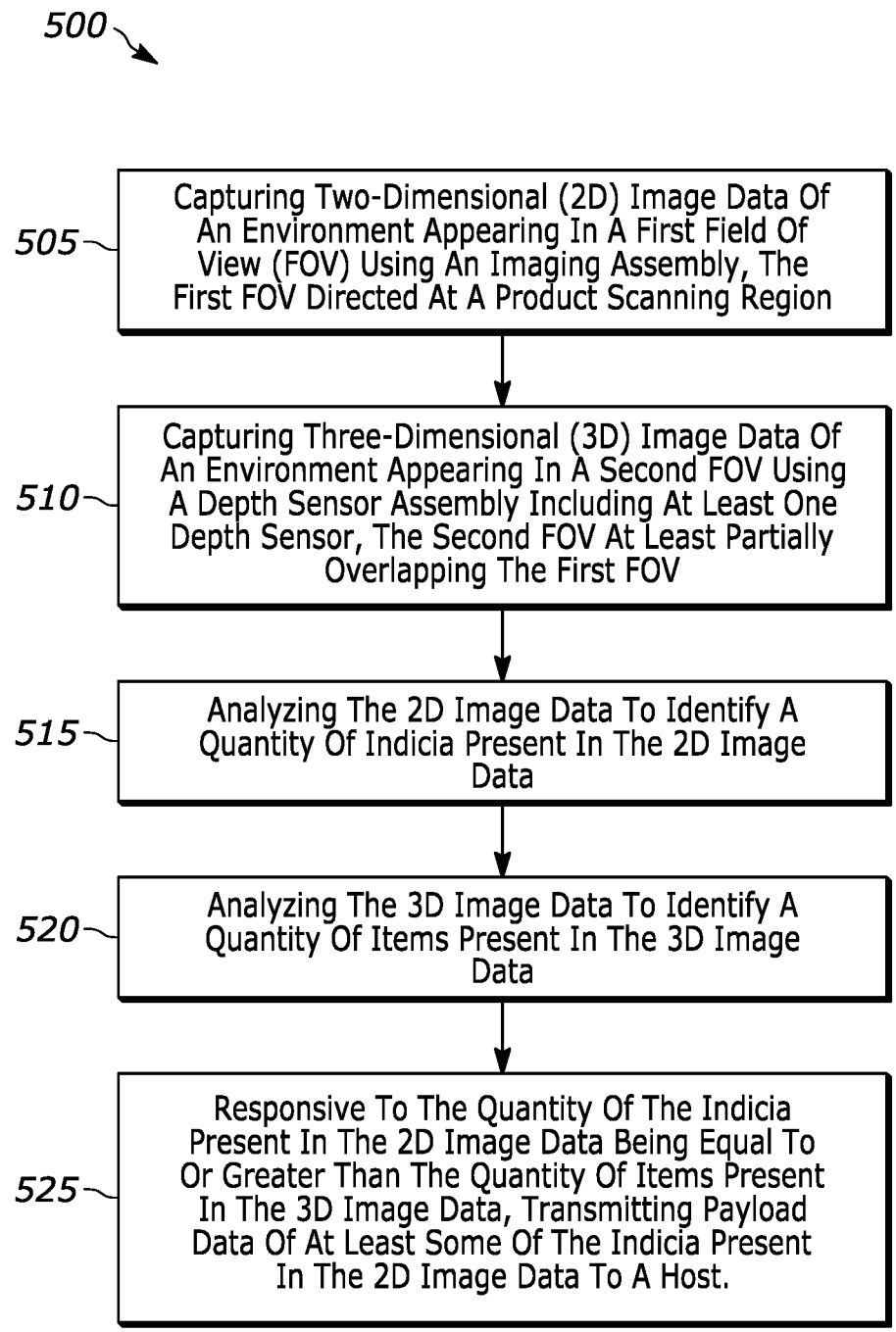
FIG. 5 a flowchart illustrating an example method of indicia reading of the present invention.

FIG. 5 is a block flowchart illustrating a method for decoding multiple-indicia. Although the example method 500 is described with reference to the flowchart illustrated in FIG. 4, it will be appreciated that many other methods of performing the acts associated with the method 500 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

In example method 500, 2D image data of an environment appearing in a first FOV 107 is captured using an imaging assembly, in which the first FOV 107 is directed at a product scanning region 109 (block 505). For example, the imaging assembly may include an image sensor, such as a 2D camera, to capture frames of the environment appearing in the first FOV 107, such as at a retail self-checkout counter. Example method 500 also includes capturing 3D image data of an environment appearing in a second FOV 108 using a depth sensor assembly including at least one depth sensor, in which the second FOV 108 at least partially overlapping the first FOV 107 (block 510). For example, a time of flight sensor may be used to collect 3D image and depth data regarding objects appearing in the second FOV 108.

Also example method 500 includes Analyzing the 2D image data to identify a quantity of indicia present in the 2D image data and analyzing the 3D image data to identify a quantity of items present in the 3D image data (block 515 and 520). For example, a controller 115 may transmit the 2D image data to a barcode-finder module 124, which identifies coordinates of indicia in the 2D image data, and the controller 115 may transmit the 3D image data and the coordinates of identified indicia to a decoder module 126, which decodes the payload data of the identified indicia in order to identify a quantity of items present. Finally, example method 500 includes, responsive to the quantity of the indicia present in the 2D image data being equal to or greater than the quantity of items present in the 3D image data, transmitting payload data of at least some of the indicia present in the 2D image data to a host. For example, the controller 115 may determine that three indicia and three objects appear in the product scanning region in the 2D image data and the 3D image data. Accordingly, the controller 115 may transmit the payload data of all three indicia to a host POS system.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An indicia reading device comprising:
   an imaging assembly configured to capture two-dimensional (2D) image data of an environment appearing in a first field of view (FOV), the first FOV directed at a product scanning region;
   a depth sensor assembly including at least one depth sensor, wherein the at least one depth senor is configured to capture three-dimensional (3D) image data of an environment appearing in a second FOV, the second FOV at least partially overlapping the first FOV;
   a controller, having at least a processor and a memory, communicably coupled to the imaging assembly and depth sensor assembly, the memory storing computer-readable instructions which when executed by the processor causes the controller to:
   analyze the 2D image data to identify a quantity of indicia present in the 2D image data;
   analyze the 3D image data to identify a quantity of items present in the 3D image data; and
   responsive to the quantity of the indicia present in the 2D image data being equal to or greater than the quantity of items present in the 3D image data, transmit payload data of at least some of the indicia present in the 2D image data to a host.

2. The indicia reading device of claim 1, wherein the memory stores the computer-readable instructions which when executed by the processor further cause the controller to, responsive to the quantity of the indicia present in the 2D image data being less than the quantity of items present in the 3D image data, transmit a message to a processing module for a determination of whether or not at least some of the items present in the 3D image data are not required to be associated with an indicium, and take responsive action based on the determination of whether or not the at least some of the items present in the 3D image data are not required to be associated with the indicium.

3. The indicia reading device of claim 1, wherein the memory stores the computer-readable instructions which when executed by the processor further cause the controller to, responsive to the quantity of the indicia present in the 2D image data being less than the quantity of items present in the 3D image data, transmit a message to an alert module indicating a mismatch between the quantity of the indicia and the quantity of the items.

4. The indicia reading device of claim 1, wherein the memory stores the computer-readable instructions which when executed by the processor further cause the controller to, analyze the 2D image data to identify the quantity of indicia present in the 2D image data and analyze the 3D image data to identify the quantity of items present in the 3D image data by, respectively analyzing a subset of 2D image data and a subset of 3D image data that overlap at least partially in acquisition time.

5. The indicia reading device of claim 1, wherein the memory stores the computer-readable instructions which when executed by the processor further cause the controller to, analyze the 2D image data to identify the quantity of indicia present in the 2D image data by at least one of transmitting the data to a decoder module and transmitting the data to a barcode-finder module, the barcode-finder module occurring prior to the decoder module in a processing pipeline.

6. The indicia reading device of claim 1, wherein the memory stores the computer-readable instructions which when executed by the processor further cause the controller to, analyze the 3D image data to identify the quantity of items present in the 3D image data by identifying gaps of predetermined length or volume between objects appearing within the product scanning region.

7. The indicia reading device of claim 1, wherein the memory stores the computer-readable instructions which when executed by the processor further cause the controller to, analyze the 3D image data to identify the quantity of items present in the 3D image data by determining a volume of an object appearing within the product scanning region and, based on volumetric data associated with at least one of the indicia present in the 2D image data, further determining a quantity of items that would be required to achieve a combined volume such that the combined volume would be within a predetermined threshold of the volume of the object appearing within the product scanning region.

8. The indicia reading device of claim 1, wherein the indicia present in the 2D image data is limited to indicia of the same type, and wherein the memory stores the computer-readable instructions which when executed by the processor further cause the controller to, transmitting payload data of at least some of the indicia present in the 2D image data to a host responsive to the quantity of the indicia present in the 2D image data being equal to the quantity of items present in the 3D image data.

9. The indicia reading device of claim 1, wherein the memory stores the computer-readable instructions which when executed by the processor further cause the controller to, responsive to the quantity of the indicia present in the 2D image data being equal to or greater than the quantity of items present in the 3D image data, generate at least one of a visual alert or an audio alert indicative of the quantity of items present in the 3D image data.

10. The indicia reading device of claim 1, wherein the memory stores the computer-readable instructions which when executed by the processor further cause the controller to:

determine if each of the items present in the 3D image data is associated with a respective at least one of the indicia present in the 2D image data; and responsive to determining that each of the items present in the 3D image data is associated with the respective at least one of the indicia, transmit payload data of at least some of the indicia present in the 2D image data to a host wherein the payload data of at least some of the indicia is limited to a payload of the respective at least one of the indicia associated with each of the items present in the 3D image data.

11. A method of indicia reading comprising:

capturing two-dimensional (2D) image data of an environment appearing in a first field of view (FOV) using an imaging assembly, the first FOV directed at a product scanning region;

capturing three-dimensional (3D) image data of an environment appearing in a second FOV using a depth sensor assembly including at least one depth sensor, the second FOV at least partially overlapping the first FOV;

analyzing the 2D image data to identify a quantity of indicia present in the 2D image data;

analyzing the 3D image data to identify a quantity of items present in the 3D image data; and responsive to the quantity of the indicia present in the 2D image data being equal to or greater than the quantity of items present in the 3D image data, transmitting payload data of at least some of the indicia present in the 2D image data to a host.

12. The indicia reading method of claim 11, further comprising, responsive to the quantity of the indicia present in the 2D image data being less than the quantity of items present in the 3D image data, transmitting a message to a processing module for a determination of whether or not at least some of the items present in the 3D image data are not required to be associated with an indicium, and taking responsive action based on the determination of whether or not the at least some of the items present in the 3D image data are not required to be associated with the indicium.

13. The indicia reading method of claim 11, further comprising, responsive to the quantity of the indicia present in the 2D image data being less than the quantity of items present in the 3D image data, transmitting a message to an alert module indicating a mismatch between the quantity of the indicia and the quantity of the items.

14. The indicia reading method of claim 11, the method including analyzing the 2D image data to identify the quantity of indicia present in the 2D image data and analyze the 3D image data to identify the quantity of items present in the 3D image data by, respectively analyzing a subset of 2D image data and a subset of 3D image data that overlap at least partially in acquisition time.

15. The indicia reading method of claim 11, the method including analyzing the 2D image data to identify the quantity of indicia present in the 2D image data by at least one of transmitting the data to a decoder module and transmitting the data to a barcode-finder module, wherein the barcode-finder module processes the 2D image data prior to the decoder module in a processing pipeline.

16. The indicia reading method of claim 11, the method including analyzing the 3D image data to identify the quantity of items present in the 3D image data by identifying gaps of predetermined length or volume between objects appearing within the product scanning region.

17. The indicia reading method of claim 11, further comprising analyzing the 3D image data to identify the quantity of items present in the 3D image data by determining a volume of an object appearing within the product scanning region and, based on volumetric data associated at least one of the indicia present in the 2D image data, and further determining a quantity of items that would be required to achieve a combined volume such that the combined volume would be within a predetermined threshold of the volume of the object appearing within the product scanning region.

18. The indicia reading method of claim 11, further comprising the indicia present in the 2D image data being limited to indicia of the same type and transmitting payload data of at least some of the indicia present in the 2D image data to a host responsive to the quantity of the indicia present in the 2D image data being equal to the quantity of items present in the 3D image data.

19. The indicia reading method of claim 11, further comprising responsive to the quantity of the indicia present in the 2D image data being equal to or greater than the quantity of items present in the 3D image data, generating at least one of a visual alert or an audio alert indicative of the quantity of items present in the 3D image data.

20. The indicia reading method of claim 11, further comprising:
- determining if each of the items present in the 3D image data is associated with a respective at least one of the indicia present in the 2D image data; and
- responsive to determining that each of the items present in the 3D image data is associated with the respective at least one of the indicia, transmitting payload data of at least some of the indicia present in the 2D image data to a host wherein the payload data of at least some of the indicia is limited to a payload of the respective at least one of the indicia associated with each of the items present in the 3D image data.

* * * * *